United States Patent
Dupaquis et al.

(10) Patent No.: US 8,028,015 B2
(45) Date of Patent: Sep. 27, 2011

(54) METHOD AND SYSTEM FOR LARGE NUMBER MULTIPLICATION

(75) Inventors: Vincent Dupaquis, Biver (FR); Russell Hobson, Glasgow (GB)

(73) Assignee: Inside Contactless S.A., Aix-en-Provence (FR)

( * ) Notice: Subject to any disclaimer, the term of this patent is extended or adjusted under 35 U.S.C. 154(b) by 1065 days.

(21) Appl. No.: 11/837,387

(22) Filed: Aug. 10, 2007

(65) Prior Publication Data

US 2009/0043836 A1    Feb. 12, 2009

(51) Int. Cl.
G06F 7/523 (2006.01)

(52) U.S. Cl. ................................................. 708/626

(58) Field of Classification Search .................. None
See application file for complete search history.

(56) References Cited

U.S. PATENT DOCUMENTS

| | | | | |
|---|---|---|---|---|
| 6,026,483 A * | 2/2000 | Oberman et al. | ........... | 712/221 |
| 6,434,585 B2 | 8/2002 | McGregor et al. | | |
| 6,484,194 B1 | 11/2002 | Henderson et al. | | |
| 6,633,896 B1 * | 10/2003 | Moore et al. | ........... | 708/620 |
| 7,392,276 B2 * | 6/2008 | Dupaquis et al. | ........... | 708/625 |
| 7,672,989 B2 * | 3/2010 | Dror et al. | ........... | 708/625 |
| 2002/0074391 A1 | 6/2002 | Takano et al. | | |
| 2002/0178196 A1 | 11/2002 | Moiner | | |
| 2004/0199560 A1 | 10/2004 | Dupaquis et al. | | |
| 2004/0199562 A1 | 10/2004 | Dupaquis et al. | | |
| 2004/0264693 A1 | 12/2004 | Shantz et al. | | |
| 2004/0267855 A1 | 12/2004 | Shantz et al. | | |
| 2005/0144216 A1 | 6/2005 | Simkins et al. | | |
| 2005/0165876 A1 | 7/2005 | Mukaida et al. | | |
| 2006/0253522 A1 | 11/2006 | Dror et al. | | |

OTHER PUBLICATIONS

International Search Report and Written Opinion of the International Searching Authority, PCT Application Serial No. PCT/US08/72697 Nov. 3, 2008, 11 pp.
Abdulla Fouad Bubshait, "Large Number Multiplication in Cryptographic Systems", May 2001, 14 pages.
Johann Großschädl and Guy-Armand Kamendje, "Architectural Enhancements for Montgomery Multiplication on Embedded RISC Processors", 2003, 17 pages.

* cited by examiner

*Primary Examiner* — David H Malzahn
(74) *Attorney, Agent, or Firm* — Fish & Richardson P.C.

(57) ABSTRACT

Methods, apparatus and systems for large number multiplication. A multiplication circuit is provided to compute the product of two operands (A and B), at least one of which is wider than a width associated with the multiplication circuit. Each of the operands includes contiguous ordered word-wide operand segments ($A_j$ and $B_i$) characterized by specific weights j (integer from 0 to k) and i (integer from 0 to m). The multiplication circuit executes a matrix of word-wide oper-and segment pair multiplication operations. Multiplication operations are performed on a pair of rows at one time. For each pair of rows, a pair of corresponding $B_i$ word-wide operand segments are read from a memory and word-wide operand segment pair multiplication operations ($A_j*B_i$) are iteratively performed for each of k+2 columns. For each column a maximum of two additional memory read operations and one memory write operation is required.

29 Claims, 4 Drawing Sheets

METHOD AND SYSTEM FOR LARGE NUMBER MULTIPLICATION

TECHNICAL FIELD

This invention relates to information management.

BACKGROUND

Conventional multiplication hardware in, for example, a solid state device can have a size limitation, for example, a specified number of bits that can be handled at one time by the hardware. Typically, multiplication hardware is defined as having a pair of single-word operand inputs and a two-word result output. To carry out multiply-accumulate operations, the multiplier output can be connected to an accumulator, which typically is at least two-words plus one-bit wide. The supplemental bit can be part of the result, or simply be present as carry information indicating either an overflow in the case of addition, or an underflow in the case of subtraction, in the accumulate part of the operation.

In cryptography and other applications, there is a need to multiply very large integers including a large number of words. In order to perform these operations using operands that are much wider than the multiplication hardware, the operands can be sliced into one-word wide segments and fed into the hardware in some specified sequence. The segments are operated upon and the intermediate results are accumulated such that the final product is computed as a sum of cross-products of various weights. The word-wide operand segments as well as the partial results, are stored in a memory that is addressed by the multiplier hardware's operations sequencer. For example, a sequence can keep a first operand's segment constant while the operand's segments are scanned one word at a time into the multiplier, then the first operand increments to the next word-wide segment and the scan of the second operand is repeated.

SUMMARY

This invention relates to large number multiplication. In general, in one aspect, the invention features a computer implemented method, system, and computer program product for operating a multiplication circuit to compute the product of two operands (A and B), at least one of which is wider than a width associated with the multiplication circuit. Each of the operands includes one or more contiguous ordered word-wide operand segments ($A_j$ and $B_i$) characterized by specific weights j and i, where j is an integer from 0 to k, where i is an integer from 0 to m and a word is a specified number of bits (n). The multiplication circuit executes a matrix of word-wide operand segment pair multiplication operations, the matrix including m+1 rows and k+m+2 columns, each row having a weight x and each column having a weight y. The multiplication circuit has access to a memory. Multiplication operations are performed on a pair of rows at one time. For each pair of rows a pair of corresponding $B_i$ word-wide operand segments are read from the memory and word-wide operand segment pair multiplication operations ($A_j*B_i$) are iteratively performed for each of k+2 columns, such that for each column in the matrix a maximum of two additional memory read operations and one memory write operation is required. Other implementations are disclosed.

Implementations of the invention can realize one or more of the following advantages. The multiplication circuit described can calculate a pair of rows at one time while requiring only three memory accesses (2 reads and 1 write) per column (other than initial reads of word-wide operand segments corresponding to each row), making it possible to design a more efficient memory interface as a single dual port RAM or two single port RAMs. Another advantage is that the pairs of rows can be calculated out of sequence. Randomizing the order of the row calculations can provide improved protection of sensitive data that is being used in the calculations. Power consumption by the multiplication circuit may be lower than other conventional circuits due to reduced memory accesses.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Certain applications require multiplying together numbers that are larger than a machine size of hardware used to calculate the result. By way of an illustrative example, a microprocessor with a machine size of 32 bits may be required to calculate the result of a multiplication with 128-bit input operands. Because the input data is larger than the microprocessor's machine size, the input data can be stored in RAM or another similar temporary storage memory, or can reside in caches or registers internal to the microprocessor. Given two 128-bit input operands A and B, which are stored in RAM, and are to be operated on by a 32-bit microprocessor, with:

A=0x11111111222222223333333344444444; and

B=0x55555555666666667777777788888888;

where 0x denotes a hexadecimal number;

the calculation can be broken down into machine size words, in this example, 32-bit word-wide operand segments, as follows:

$$A = A_0 + A_1*2^{32} + A_2*2^{64} + A_3*2^{96}; \text{ and}$$

$$B = B_0 + B_1*2^{32} + B_2*2^{64} + B_3*2^{96};$$

where:

$A_0$=0x4444444; $A_1$=0x33333333; $A_2$=0x22222222; $A_3$=0x11111111; and $B_0$=0x88888888; $B_1$=0x77777777; $B_2$=0x66666666; $B_3$=0x55555555.

The calculation proceeds with each 32-bit word-wide operand segment of the first operand A being multiplied by each of the word-wide operand segments in the other second operand B. The following describes a multiplication circuit and process for operating the multiplication circuit such that the number of read and write accesses to a memory including the operands A and B can be reduced, so as to provide an efficient memory interface.

Example System Including Multiplication Circuit

Figure 1:
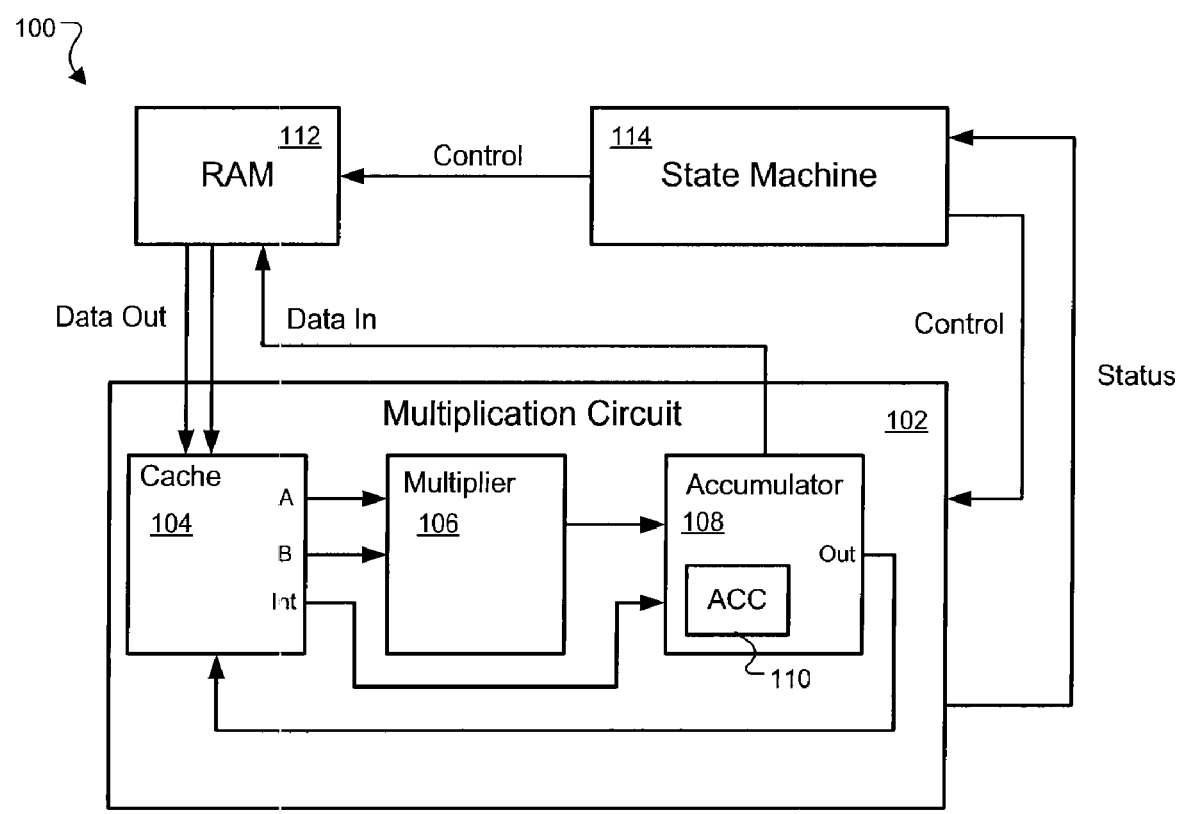
FIG. 1 is a block diagram showing an example of a multiplication circuit.

Referring to FIG. 1, a system 100 is shown including a multiplication circuit 102. The system 100 can compute a product of two operands that can be wider than the multiplication circuit 102. For example, the multiplication circuit 102 can be implemented using 32-bit wide hardware and the operands can be 64 bits, 128 bits, 1024 bits, or other number of bits wider than 32 bits. The system 100 is configured to compute the product of the operands efficiently by reducing the number of memory operations, while using a reduced hardware size.

The multiplication circuit 102 includes a cache 104, a multiplier 106, and an accumulator 108. The multiplier 106 includes inputs from the cache 104. For example, the inputs can be word-wide operand segments of the multiplication operands. In some implementations, the multiplier 106 can multiply two word-wide operand segments to form an at least two-word-wide intermediate product. For example, the multiplier 106 can multiply two 32 bit operand segments to form an at least 64 bit intermediate product. An intermediate product resulting from the word-wide operand segment pair multiplication operation is received by the accumulator 108.

The accumulator 108 receives inputs from the multiplier 106 and the cache 104. For example, the accumulator 108 can receive the intermediate product from the multiplier 106 and an intermediate column result from the cache 104. The accumulator includes an accumulation register 110. In certain implementations, the accumulation register 110 can be a temporary data storage of at least 2n+2 bits (where n is the number of bits in one word). In other implementations, the accumulation register 110 can be implemented in sizes wider than 2n+2 bits.

In some implementations, the accumulator 108 can be configured to accumulate the inputs in the accumulation register 110. For example, the accumulator 108 can add the intermediate product (from the multiplier 106) to a value stored in the accumulation register 110. Then, the accumulator 108 can store the accumulation result in the accumulation register 110. The accumulator 108 can also be configured to reset a value stored in the accumulation register 110. For example, the accumulator 108 can reset the accumulation register 110 to zero. In another example, the accumulator 108 can reset the accumulation register 110 to an upper word of the accumulated value.

The accumulator 108 is connected to a memory element, e.g., a random access memory (RAM) 112. In some implementations, the accumulator 108 can transmit one-word-wide data to the RAM 112. In an example operation, the accumulator 108 can extract a lower word of the accumulated value to be written to the RAM 112. Next, the accumulator 108 can reset the accumulation register 110 by storing only the upper word of the accumulated value in the accumulation register 110.

The RAM 112 can transmit data to the cache 104. As shown, the RAM 112 can transmit two one-word-wide operand segments to the cache 104. Because a multiplication cycle (as described further below) requires only two reads from the RAM 112, the RAM 112 can include two memory interfaces per column. In one implementation, the RAM 112 is a dual-port RAM, and in another implementation the RAM 112 is a memory module having two single-port RAMs. Although a RAM is used in this example, other read-write memory, such as flash memory, serial access memory, or other read-write data storage device, can also be used in other implementations.

The system 100 includes a state machine 114 to control the operations of the multiplication circuit 102. For example, the state machine 114 can control the memory accesses from the cache 104 to the RAM 112. As shown, the state machine 114 receives status signals from the multiplication circuit 102. Based on the status signals, the state machine 114 can determine a current status of the multiplication circuit 102. Based on the current status, the state machine 114 can then transmit control signals to the RAM 112 and/or the multiplication circuit 102. In one example, the state machine 114 can receive the status signals to determine whether the cache 104 has finished reading operand segments from the RAM 112. If the cache 104 has finished reading the operand segment, the state machine 114 can, for example, transmit control signals to the multiplication circuit 102 to multiply the operand segments using the multiplier 106. Some examples of operation sequences of the state machine 114 are described below with reference to FIG. 3.

In some implementations, the state machine 114 can be a digital logic circuit (e.g., field programmable gate array (FPGA), application specific integrated circuit (ASIC), discrete digital circuit components, or a combination thereof) that includes a hardware state machine structure to control the multiplication circuit. In other implementations, the state machine 114 can be a computer program processed by the system 100 to operate the multiplication circuit 102. In another implementation, the state machine 114 can be a processor that executes software instructions to perform operation sequences to multiply two operands using the multiplication circuit 102.

In various examples, the state machine 114 can be an operation sequencer that is configured to control the accessing of the RAM 112 by the cache 104 and to control the sequence of multiply and accumulate operations performed by the multiplier 106 and the accumulator 108, respectively. In another example, the state machine 114 can instruct the multiplication circuit 102 to multiply two word-wide operands using the multiplier 106. For example, the state machine 102 can specify two word-wide operands from the cache 104 to be multiplied by the multiplier 106. In another example, the state machine 114 can instruct the multiplication circuit 102 to accumulate a result from the multiplier in the accumulation register 110. For example, the accumulator 108 can accumulate the two-word-wide multiplication result with an existing value in the accumulation register 110 and store the accumulation result in the accumulation register 110. In another example, the state machine 114 can instruct the multiplication circuit 102 to store a word (e.g., an upper word or a lower word) from the accumulation register 110 to the RAM 112. For example, the state machine 114 can cause the accumulator 108 to extract an upper word and/or a lower word from the accumulation register 110 and store the extracted data word (s) in the RAM 112. In another example, the state machine 114 can instruct the multiplication circuit 102 to reset the accumulation register 110. For example, the state machine 114 can cause the accumulator 108 to extract an upper word from the accumulation register 110 and reset the accumulation register 110 to be the extracted upper word.

Illustrative Example of Multiplication Circuit Operation

Figure 2:
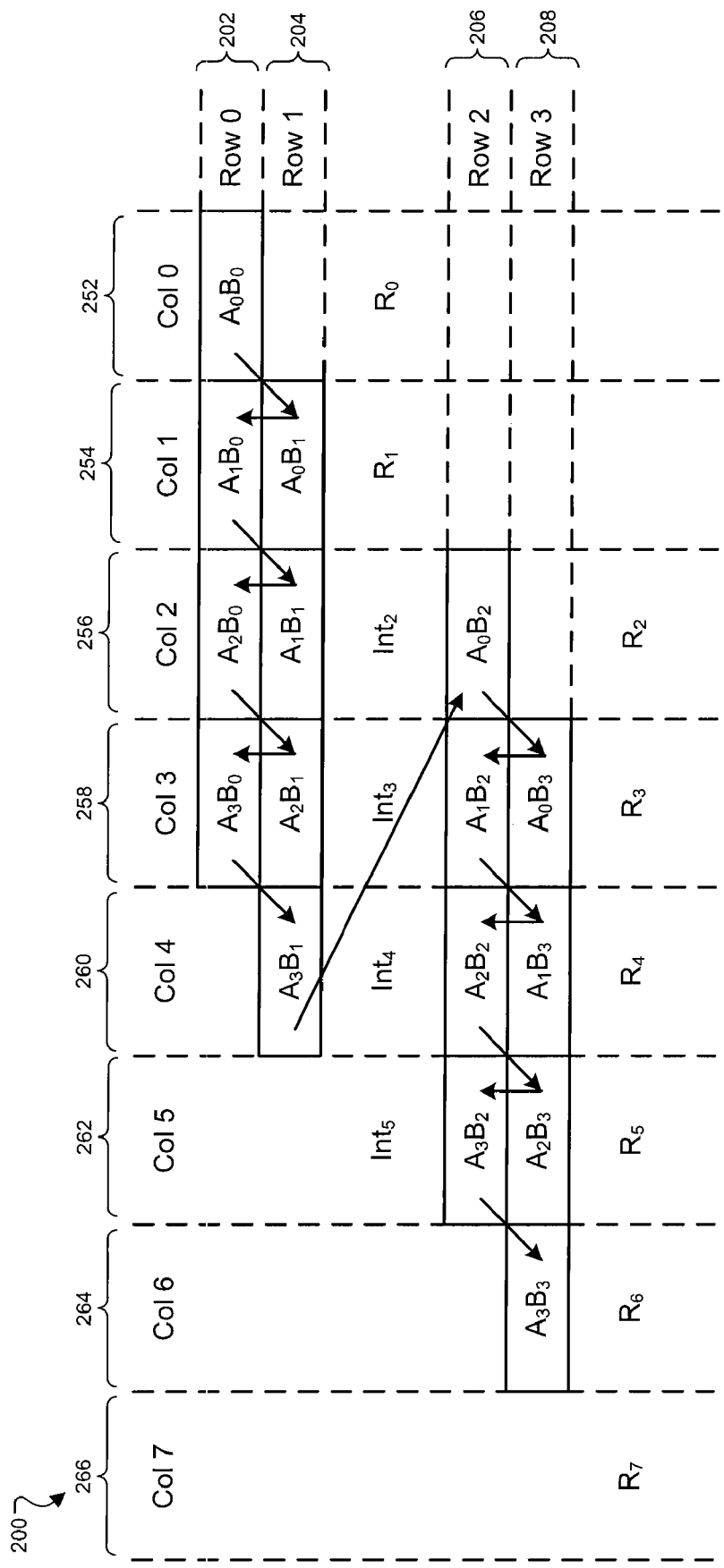
FIG. 2 is a schematic representation of a first example multiplication matrix.

Referring to FIG. 2, operations of the multiplication circuit 102 shall be described by way of an illustrative example using the A and B operands defined above. Each operand A and B includes contiguous ordered word-wide operand segments $A_j$ and $B_i$, for example, $A_0$-$A_3$ and $B_0$-$B_3$ defined above. Each word-wide operand segment is characterized by a specific weight j or i. The weight j for each A word-wide operand segment is an integer from 0 to k, where k is the maximum weight, being "3" in this example. The weight i for each B word-wide operand segment is an integer from 0 to m, where m is the maximum weight, being "3" in this example.

FIG. 2 shows a schematic representation of a multiplication matrix 200 including m+1 rows and k+m+2 columns. Each row has a weight x and each column has a weight y. In this example, the row weights range from 0 to 3 and the column weights range from 0 to 7. The multiplication operations are performed on a pair of rows at one time, rather than on a single row-by-row basis. For each pair of rows, a pair of corresponding $B_i$ word-wide operand segments are read from the memory and word-wide operand segment pair multiplication operations ($A_j*B_i$) are iteratively performed for each of the column that include cells populated for a given pair of rows. As such, when performing the multiplication operations for each column, a maximum of two additional memory read operations and one memory write operation is required. Advantageously, an efficient memory interface can thereby be used in the system, such as a dual-port RAM or two single-port RAMs.

The state machine 114 can operate the multiplication circuit 102 to execute word-wide operand segment pair multiplication operations represented by the multiplication matrix 200. The state machine 114 selects to perform multiplication operations on a pair of rows in the multiplication matrix 200 at a time. After multiplication operations of the pair of rows are completed, the state machine 114 selects another pair of rows until all word-wide operand segment pair multiplications are completed.

In the depicted example, the state machine 114 selects to perform word-wide operand segment multiplications in the sequence indicated by arrows in the FIG. 2. As shown, the state machine 114 can select rows 202, 204 in the multiplication matrix 200. After the multiplication operations are completed, the state machine 114 selects rows 206, 208. In one implementation, the state machine 114 selects a pair of rows according to a numerical sequence of increasing or decreasing weight values of the weight for the rows included in each pair. For example, the state machine 114 can select a pair of rows with weights t and t+1, followed by a selection of a pair of rows having weights t+2 and t+3. However, in another implementation, the selection of row pairs can be randomized. Randomizing the sequence of row pair calculations can provide improved security of data used in the multiplication operations.

Referring again to FIG. 2, upon selecting the rows 202, 204, the state machine 114 can instruct the multiplication circuit 102 to read a pair of corresponding B word-wide operand segments. That is, B word-wide operand segments with corresponding weight values are read to the cache 104, being $B_0$ and $B_1$ in this example. The state machine 114 can populate the cells in the rows 202, 204 by iteratively performing word-wide operand segment pair multiplication operations for each column from weight 0 to weight 4.

As an example, the state machine 114 can first instruct the cache 104 to read an operand segment $A_0$ from the RAM 112. Next, the state machine 114 can instruct the multiplication circuit 102 to compute an intermediate product of $A_0*B_0$. The multiplication circuit 102 stores the intermediate product in the accumulation register 110. The state machine 114 can instruct the multiplication circuit 102 to write the lower word (i.e., the least significant n bits) from the accumulation register 110 to the RAM 112 as a final column result ($R_0$) for the Column 0, since there are no further values in Column 0 to be calculated, i.e., for this pair of rows or any others. The state machine 114 can reset the accumulation register 110 to be the upper word in the accumulated register 110, where the upper word is a carry value ($C_0$) used in calculating a result for a next column 254. Thus, to calculate Column 0, only one read operation (reading $A_0$) and one write operation (write $R_0$) to and from the RAM 112 were required.

Using the carry value $C_0$ and an additional operand segment $A_1$ read from the RAM 112, the state machine 114 can use the multiplication circuit 102 to compute a result for the next column 254. The state machine 114 instructs the cache 104 to read $A_1$ from the RAM 112. Next, the multiplier 106 can compute an intermediate product $A_0*B_1$ and the accumulator 108 can accumulate $A_0*B_1$ with the carry value $C_0$ in the accumulation register 110. As such, the accumulation register 110 stores the sum of the carry value $C_0$ and product of $A_0*B_1$. The multiplier 106 further computes an intermediate product of $A_1*B_0$. The multiplication product $A_1*B_0$ is accumulated in the accumulation register 110. After accumulating the multiplication product, the accumulator 108 can write a lower word from the accumulation register 110 to RAM 112 as a final column result ($R_1$) and reset the accumulation register with the an upper word in the accumulation register 110 as a carry value $C_1$ for a next column 256. To summarize, for the multiplication cycle calculating Column 1:

Read operations: read $A_1$ ($A_0$ was previously read and in the cache);

Write operations: write $R_1$;

$R_1$=lower word of ($C_0+A_0*B_1+A_1*B_0$); and $C_1$=upper word of ($C_0+A_0*B_1+A_1*B_0$).

The sum of the weights of the word-wide operand segments equal the weight of the corresponding column. That is, in the example above for Column 1 254 having a weight of "1", the weights of the word-wide operand segments are 0+1=1 and 1+0=1 for each of the two multiplication operations.

For the Column 2 256, the accumulator 108 can accumulate the multiplication products $A_2*B_0$ and $A_1*B_1$, and the carry value $C_1$ from the column 254. Because the rows 202, 204 are not the final rows to be calculated for the column 254, the accumulator 108 writes the upper word of the accumulation result as an intermediate column result for Column 2 ($Int_2$). To summarize, for the multiplication cycle calculating Column 2:

Read operations: read A2 (A1 was previously read and in the cache);

Write operations: write Int2;

$Int_2$=lower word of ($C_1+A_1*B_1+A_2*B_0$); and $C_2$=upper word of ($C_1+A_1*BL+A_2*B_0$).

Similarly, for Column 3 258, the accumulator 108 writes the lower word of the accumulation result to the RAM 112 as intermediate column result $Int_3$, and for Column 4 260 the lower word of the accumulation result is written to the RAM 112 as intermediate column results $Int_4$. At this point, because there are no further A word-wide operand segments to read from RAM 112, the state machine 114 instructs the accumulator 108 to write the upper word in the accumulation register 110 to RAM 112 as an intermediate result ($Int_5$) for the next column, i.e., Column 5 262.

The state machine 114 can reset the data stored in the multiplication circuit 102. For example, the state machine 114 can reset the value stored in the accumulation register 110. In some examples, the state machine 114 can also selectively clear values stored in the cache 104.

Next, the state machine 114 can select another pair of rows, which have not been previously selected. In this example, the state machine 114 selects rows 206, 208. The state machine 114 instructs the cache 104 to read B operand segments corresponding to the rows 206, 208 (i.e., $B_2$ and $B_3$) to the cache 104. In one implementation, $B_2$ and $B_3$ can replace $B_0$ and $B_1$ in the cache 104 to reduce the size requirement of the cache 104.

The state machine 114 reads the $A_0$ value from the RAM 112 into the cache 104. The sum of the weight of $A_0$ and $B_2$ is the weight of a first column to be calculated, i.e., Column 2 256. Using the determined weight, the state machine 114 can check whether an intermediate result of weight 2 ($Int_2$) is available in the RAM 112. As previously described, $Int_2$ was previously calculated and is stored in the RAM 112, and is read into the cache 104. In one implementation, the state machine 114 can instruct the accumulator 108 to reset the accumulation register 110 to $Int_2$.

By accumulating $Int_2$ and a multiplication product of $A_0*B_2$, the multiplication circuit 102 obtains a final result for the Column 2 256 ($R_2$) and a carry value ($C_2$) for computation of the next Column 3 258. That is, after accumulation, the state machine 114 can instruct the multiplication circuit 102 to store the lower n-bit word of the accumulation result as $R_2$ and reset the accumulation register 110 to the upper word of the accumulation result as the carry value $C_2$. The lower word is a final column result in this instance because there are no additional rows in Column 2 that require calculation. To summarize, for the multiplication cycle calculating Column 2 for rows 2 and 3:

Read operations: read $Int_2$; read $A_0$;
Write operations: write $R_2$;
$R_2$=lower word of $[(A_0*B_2)+Int_2]$;
$C_2$=upper word of $[(A_0*B_2)+Int_2]$.

Thus, for the multiplication cycle per column there were two read operations and one write operation required. This does not include reading $B_2$ and $B_3$, as they are initially read and cached and used through out the calculations relating to rows 2 and 3. The maximum number of memory operations required when calculating the multiplication matrix 200 is two reads and one write per column, as demonstrated by this example. As such, the RAM 112 can be either a dual port or two single port memory.

Referring again to FIG. 2, the state machine 114 similarly can instruct the multiplication circuit 102 to compute $R_3$ by accumulating the carry value $C_2$, $A_1*B_2$, $A_0*B_3$, and $Int_3$. For example, the state machine 114 can instruct the multiplication circuit 102 to read $A_1$ and $Int_3$ from the RAM 112. Next, the state machine 114 can instruct the multiplication circuit 102 to accumulate $Int_3$ to the accumulation register 110. After accumulating $Int_3$, the state machine 114 can sequentially instruct the multiplication circuit 102 to compute and accumulate the multiplication products $A_1*B_2$ and $A_0*B_3$. By extracting the lower word and the upper word of the accumulation result, the state machine 114 can instruct the accumulator 108 to write the lower word of the accumulation result as $R_3$ and to reset the accumulation register 110 to the upper remaining bits of the accumulation result as a carry value $C_3$.

In a similar fashion, the state machine 114 can operate the multiplication circuit 102 to compute the final column results $R_4$ and $R_5$. For example, the multiplication circuit 102 can compute $R_4$ by accumulating the carry value $C_3$ from the Column 3 258, $Int_4$, $A_2*B_2$, and $A_1*B_3$. The multiplication circuit 102 can calculate $R_5$ by accumulating the carry value $C_4$ from the Column 4 260 with $Int_5$, $A_3*B_2$, and $A_2*B_3$.

Because no intermediate column result is available for a column 264, the state machine 114 can instruct the multiplication circuit 102 to accumulate $A_3*B_3$ and the carry value $C_5$ from Column 5 262. After accumulation, the multiplication circuit 102 can write the lower word of the accumulation result to RAM 112 as $R_6$. At this point, the word-wide operand segment multiplication operations for the rows 206, 208 are completed and there are no more rows to be computed. Therefore, the upper remaining bits of the accumulation result are written to the RAM 112 as the final result for Column 7 266, i.e., as $R_7$.

The multiplication result of A and B can be read, from the RAM 112, by calculating:

$$R=R_0+R_1*2^{32}+R_2*2^{64}+R_3*2^{96}+R_4*2^{128}+R_5*2^{160}+R_6*2^{192}+R_7*2^{224}.$$

Example Process to Perform Calculations for a Multiplication Matrix

Figure 3:
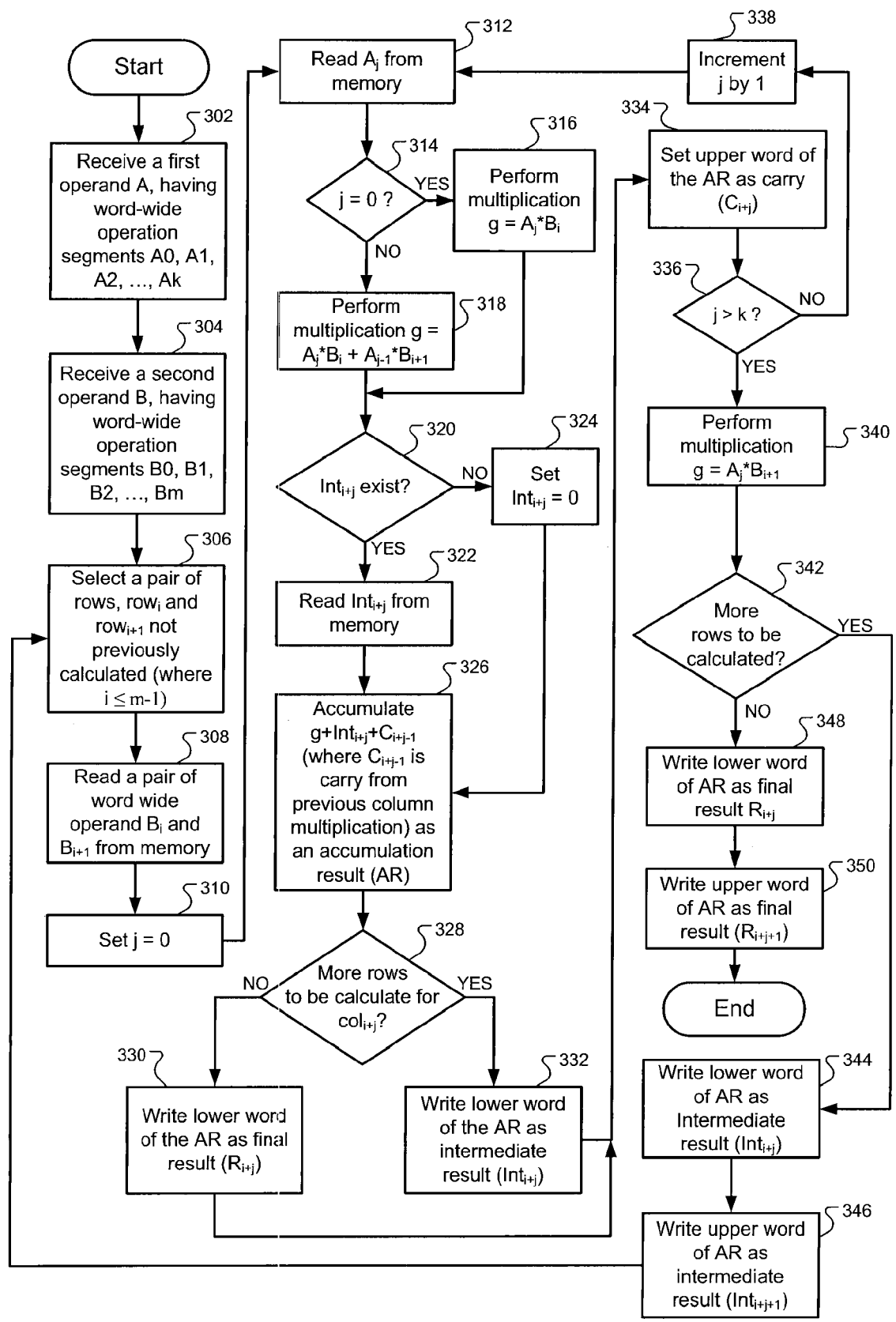
FIG. 3 is a flow diagram showing an example process for computing the product of two operands according to the multiplication matrix of FIG. 2.

Referring now to FIG. 3, one implementation of a process 300 that can be used to perform the calculations for a multiplication matrix using the system 100 is shown. For illustrative purposes, the process 300 shall be described in the context of the example discussed above and the example multiplication matrix 200 shown in FIG. 2. The process 300 begins with receiving a first operand, having word-wide operand segments $A_0, A_1, A_2, \ldots, A_k$ in step 302. For example, the system 100 can receive a first operand A with operand segments $A_0$-$A_3$, i.e., k=3. Next, the process 300 includes, in step 304, receiving a second operand B, having word-wide operand segments $B_0, B_1, B_2, \ldots B_m$. For example, the system 100 can receive a second operand B with operand segments $B_0$-$B_3$, i.e., m=3.

In step 306, the process 300 includes selecting a pair of rows, $row_i$ and $row_{i+1}$, that have not been previously calculated (where i≦m−1). For example, the state machine 114 can select the rows 202, 204 to perform multiplication operations using the operand segments. Next, the process 300 includes reading a pair of word-wide operands $B_i$ and $B_{i+1}$ from memory in step 308. For example, the cache 104 can read a pair of word-wide operand segments from the RAM 112. The process 300 includes, in step 310, setting j=0, that is, the state machine 114 can select a weight j of $A_j$ initially to be zero.

The process 300 includes reading $A_j$ from the memory in step 312. For example, the cache 104 can read the operand segment $A_0$ from the RAM 112. In step 314, the process 300 includes determining whether j=0. If j=0, then the process 300 includes, in step 316, performing multiplication $g=A_j*B_i$. For example, the multiplication circuit 102 can perform a multiplication $A_0*B_2$ for the Column 2 256 when the rows 206, 208 are selected. If j≠0, then the process 300 includes performing multiplication $g=A_j*B_i+A_{j-1}*B_{i+1}$ in step 318. For example, the multiplication circuit 102 can perform a multiplication $A_1*B_0+A_0*B_1$ at column 254 to compute $R_1$ when the rows 202, 204 are selected.

After performing multiplication at step 316 or 318, the process 300 includes determining whether $Int_{i+j}$ (an intermediate column result with weight=i+j) exists in step 320. For example, the state machine 114 can check whether $Int_2$ exists in the RAM 112. If $Int_{i+j}$ exists, then the process 300 includes reading $Int_{i+j}$ from the memory in step 322. In the example described above, the cache 104 can read $Int_2$ when the rows 206, 208 are selected because the column 256 has been previously calculated (in the rows 202, 204). If $Int_{i+j}$ does not exist, then the process 300 includes, in step 324, setting $Int_{i+j}$ to zero, otherwise step 322 is performed to read $Int_{i+j}$ from the memory.

After reading $Int_{i+j}$ from the memory in step 322 or setting $Int_{i+j}$ to zero in step 324, the process 300 includes, in step 326, accumulating $g+Int_{i+j}+C_{i+j-1}$ (where $C_{i+j-1}$ is a carry from previous column multiplication). For example, the accumulator 108 can accumulate $Int_3$, $A_1*B_2$, $A_0*B_3$, and a carry $C_2$ from the multiplication of the Column 2 256 to compute a column result for the Column 3 258. After accumulating, the process 300 includes, in step 328, determining more rows to be calculated for $Col_{i+j}$. For example, the state machine 114 can determine whether more rows in the matrix 200 are needed to be populated for the $Col_{i+j}$. If no more rows are to be calculated for $Col_{i+j}$, then the process 300 includes writing the lower word of the accumulation result as a final result $(R_{i+j})$ for $Col_{i+j}$ in step 330. For example, for Column 1 254 the accumulator 108 can write the lower word of the accumulation result of $A_1*B_0$, $A_0*B_1$, and the carry $C_1$ from Column 0 252 as $R_1$, because there are no more rows to calculate for the Column 1 254. If more rows are to be calculated for the $Col_{i+j}$, then the process 300 includes writing the lower word of the accumulation result as an intermediate result $(Int_{i+j})$ in step 332. For example, in calculating the rows 202, 204, the accumulator 108 can write the lower word of the accumulation result of $A_3*B_0$, $A_2*B_1$, and the carry $C_2$ from the column 256 as $Int_3$ (rather than $R_3$) because more rows must yet be calculated for the Column 3 258.

The process 300 includes setting the upper remaining bits of the accumulation result as carry $(C_{i+j})$ in step 334. For example, the accumulator 108 can reset the accumulation register 110 to the upper word of a value currently stored in the accumulation register 110. In step 336, the process 300 includes determining whether j>k. If j≦k, then the step 312 is repeated. If j>k, then the process 300 includes, in step 340, performing multiplication $g=A_j*B_{i+1}$. For example, in performing multiplication for the Column 6 264 (where j=k=3), the multiplication circuit 102 can perform $A_3*B_3$.

In step 342, the process 300 includes determining whether more rows are to be calculated. For example, the state machine 114 can check whether any row in the matrix 200 is not populated. If more rows are to be calculated, then the process 300 includes writing the lower word of the accumulation result as an intermediate result $(Int_{i+j})$ in step 344. Next, the process 300 includes, in step 346, writing the upper word of the accumulation result as intermediate result $(Int_{i+j+1})$ and process cycles back to step 306 and continues. For example, when the rows 202, 204 are selected, the multiplication circuit 102 can write the lower word in the accumulation register 110 as $Int_4$ and the upper word in the accumulation register 110 as $Int_5$ after performing the multiplication operations for the Column 4 260.

In step 342, if no more rows are to be calculated, then the process 300 includes, in step 348, writing the lower word of accumulation result as a final result $(R_{i+j})$. Next, the process 300 includes, in step 350, writing the upper word of the accumulation result as a final result $R_{i+j+1}$ and the process 300 ends. For example, when calculating the column 264 after the rows 202, 204 are completed, the accumulator 108 can write the lower word in the accumulation register 110 as R6 and the upper word in the accumulation register 110 as the R7. The multiplication result of A and B then can be read, from the RAM 112, by calculating:

$$R=R_0+R_1*2^{32}+R_2*2^{64}+R_3*2^{96}+R_4*2^{128}+R_5*2^{160}+R_6*2^{192}+R_7*2^{224}.$$

Although some implementations of the multiplication system and process are described, other implementations can also be used. In various implementations, the state machine 114 can select a pair of rows randomly from the m+1 rows. For example, the state machine 114 can include a random number generator. Using the random number generator, the state machine 114 can generate a random number representing a pair of rows in the matrix 200 that are not previously selected. The state machine 114 can then proceed to use the randomly selected rows to perform multiplication operations.

In some examples, the random selection can improve security of the system 100. A pair of rows does not have to be a pair of adjacent rows; any two rows can be a pair.

In some implementations, the state machine 114 can be configured to perform multiplication operations for more than two rows at a time. In such an implementation, a larger accumulator may be required. In one example, the system 100 can select a group of three or more rows to perform multiplication operations at one time. In some implementations, the three or more rows are selected according to a numerical sequence of increasing or decreasing weight values of weight for the rows included in each group. In some examples, selecting more rows for multiplication can further reduce memory accesses for multiplying two large numbers.

The steps in process 300 and in the example described in relation to FIG. 2 can be performed in a different order than described above. The order of the steps described in the illustrative examples herein are illustrative, and the desired results can be achieved by carrying out some or all of the steps in a different order.

Figure 4:
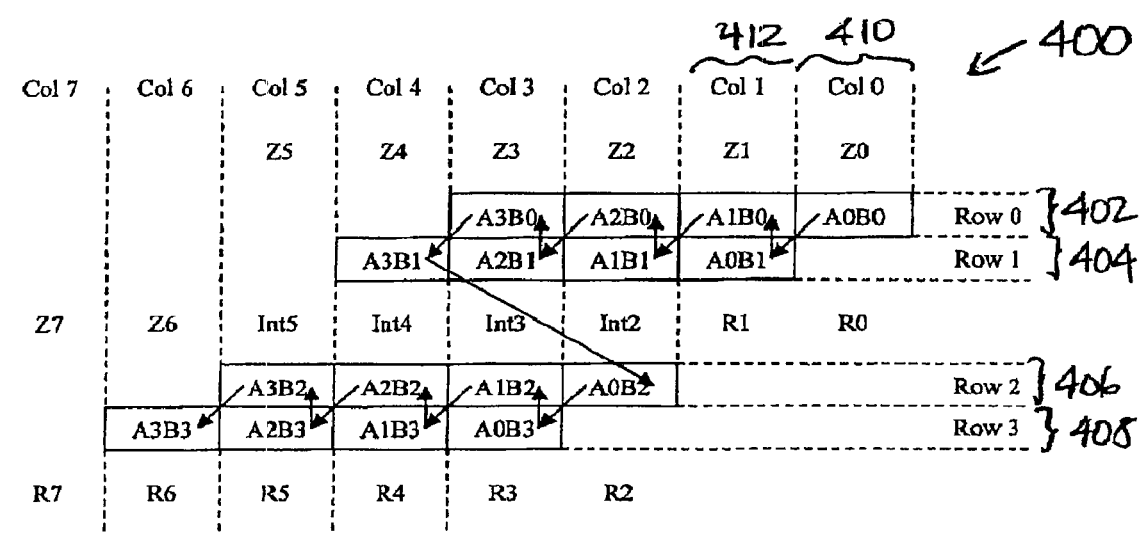
FIG. 4 is a schematic representation of a second example multiplication matrix.

In other implementations, the techniques described above can also be used to perform a series of mathematical operations, for example, A*B+Z or Z−A*B or A*B−Z, although other operations are possible. By way of illustrative example, FIG. 4 shows a multiplication matrix 400 that can be executed to compute: A*B+Z, where:
A=0x1111111122222222333333344444444;
B=0x5555555566666666777777788888888; and
Z=0x9999999910101010121212141414141616161 8181818202020202242424 where 0x denotes a hexadecimal number;
the calculation can be broken down into machine size words, in this example, 32-bit word-wide operand segments, as follows:

$$A=A_0+A_1*2^{32}+A_2*2^{64}+A_3*2^{96};$$

$$B=B_0+B_1*2^{32}+B_2*2^{64}+B_3*2^{96};\text{ and}$$

$$Z=Z_0+Z_1*2^{32}+Z_2*2^{64}+Z_3*2^{96}+Z_4*2^{128}+Z_5*2^{160}+Z_6*2^{192}+Z_7*2^{224}$$

where:
$A_0$=0x44444444; $A_1$=0x33333333; $A_2$=0x22222222; $A_3$=0x11111111;
$B_0$=0x88888888; $B_1$=0x77777777; $B_2$=0x66666666; $B_3$=0x55555555; and
$Z_0$=0x24242424; $Z_1$=0x20202020; $Z_2$=0x18181818; $Z_3$=0x16161616;
$Z_4$=0x14141414; $Z_5$=0x12121212; $Z_6$=0x10101010; $Z_7$=0x99999999.

Referring to the matrix 400, the multiplication operations of A and B occur substantially the same as the operations described above in reference to FIG. 2. However, in this implementation, when calculating Rows 0 (402) and 1 (404), the Z word-wide operand segments are summed to the multiplication products in a similar manner than the intermediate values, e.g., Int2, Int3, etc., are summed to the multiplication products when calculating Rows 2 (406) and 3 (408). That is, for example, when calculating Col 0 (410) for Rows 0 (402) and 1 (404), the operations are as follows, after an initial read operation reading values $B_0$ and $B_1$:
Read operations: read $Z_0$ and $A_0$
Write operations: write $R_0$
where $R_0$=lower word of $(A_0*B_0+Z_0)$; and
carry $C_0$=upper word of $(A_0*B_0+Z_0)$.

The operations for calculating Col 1 (412) for Rows 0 (402) and 1 (404), are as follows:

Read operations: read $Z_1$ and $A_1$
Write operations: write $R_1$
where $R_1$=lower word of $(A_1*B_0+A_0*B_1+C_0+Z_1)$; and
carry $C_1$=upper word of $(A_1*B_0+A_0*B_1+C_0+Z_1)$.

The balance of the matrix can be calculated in a similar manner as above. Accordingly, the calculations can be carried out without more than two read operations per column for a pair of rows.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method of operating a multiplication circuit to compute the product of two operands (hereby identified as A and B), at least one of which is wider than a width associated with the multiplication circuit, where operand A comprises one or more contiguous ordered word-wide operand segments characterized by weight j and identified as $A_j$, where j is an integer from 0 to k and operand B comprises one or more contiguous ordered word-wide operand segments characterized by weight i and identified as $B_i$, where i is an integer from 0 to m, and a word is a specified number of bits (n), and where the multiplication circuit executes a matrix of word-wide operand segment pair multiplication operations, the matrix comprising m+1 rows and k+m+2 columns, each row having a weight x where x is an integer from 0 to m and each column having a weight y where y is an integer from 0 to (k+m+1), the multiplication circuit having access to a memory, the method comprising:

performing multiplication operations on a pair of rows at one time, where for each pair of rows a pair of $B_i$ word-wide operand segments are read from the memory which $B_i$ segments have weights (i) that correspond to the weights (x) of the rows in the pair and word-wide operand segment pair multiplication operations ($A_j*B_i$) are iteratively performed for each of k+2 columns where for a cell that corresponds to a row with weight x and a column with weight y the word-wide operand segment pair multiplication operation comprises $A_j$ multiplied by $B_i$ where weight j is equal to (y-x) and where weight i is equal to x, such that for each column in the matrix a maximum of two memory read operations in addition to reading the pair of $B_i$ word-wide operand segments from memory and one memory write operation is required.

2. The method of claim 1, wherein the multiplication operations are performed on pairs of rows selected according to a numerical sequence of increasing or decreasing weight values of the weights for the rows included in each pair.

3. The method of claim 1, wherein the multiplication operations are performed on pairs of rows selected randomly from the m+1 rows.

4. The method of claim 1, where a word-wide operand segment pair multiplication operation for a column having a weight $y_1$, comprises performing at least one multiplication operation of an $A_j$ word-wide operand segment by a $B_i$ word-wide operand segment, where the sum of the weight j of the $A_j$ word-wide operand and the weight i of the $B_i$ word-wide operand segment is equal to the weight $y_1$ of the column.

5. The method of claim 1, further comprising:
calculating an n-bit final column result for each of the k+m+2 columns, where a final column result for a column comprises a least significant n-bit word of an accumulation of the word-wide operand segment pair multiplication operations performed for the each of the m+1 rows in relation to said column.

6. The method of claim 5, where calculating an n-bit final column result for a column comprises accumulating, for a final pair of rows calculated for the column, results of the word-wide operand segment pair multiplication operations, an intermediate column result (if any) for the column, and a carry value (if any) being an upper word of an accumulation result determined for a previously calculated column, to determine an accumulation result for said column, where the n-bit final column result comprises the least significant n bits of the accumulation result for said column.

7. The method of claim 5, where an intermediate column result for a column comprises accumulating, for a pair of rows that are not the final pair of rows to be calculated for the column, results of the word-wide operand segment pair multiplication operations, a previously calculated intermediate column result (if any) for the column, and a carry value (if any) for a previously calculated column, to determine an intermediate accumulation result for said column, where the intermediate column result comprises the least significant n bits of the intermediate accumulation result for said column.

8. The method of claim 7, where an upper word of the intermediate accumulation result for said column comprises a carry value for said column to be used in an accumulation operation for a next column.

9. The method of claim 1, where the pair of $B_i$ word-wide operand segments read from memory corresponding to the pair of rows are stored in a cache while the multiplication operations for the pair of rows are performed.

10. A computer implemented method of operating a multiplication circuit to compute the product of two operands (hereby identified as A and B), at least one of which is wider than the multiplication circuit, where operand A comprises one or more contiguous ordered word-wide operand segments characterized by weight j and identified as $A_j$, where j is an integer from 0 to k and operad B comprises one or more contiguous ordered word-wide operand segments characterized by weight and identified as $B_i$, where i is an integer from 0 to m, and a word is a specified number of bits (n), and where the multiplication circuit executes a matrix of word-wide operand segment pair multiplication operations, the matrix comprising m+1 rows and k+m+2 columns, each row having a weight x where x is an integer from 0 to m and each column having a weight y where y is an integer from 0 to (k+m+1), the multiplication circuit having access to a memory, the method comprising:

for each pair of rows in the matrix, the rows having weights $x_1$ and $x_2$, reading a pair of B operand segments from the memory, where the weight of a first B operand segment ($B_{x1}$) is $x_1$ and the weight of a second B operand segment ($B_{x2}$) is $x_2$, and further performing the following:

(a) for a column having a weight y, reading an $A_j$ operand segment from the memory identified for the column as $A_j$ where the weight $j_1$ together with the weight ($x_1$) of the first B operand segment equals the weight y of the column;

(b) for a column having a weight y, reading an intermediate column result ($Int_y$) if any, an intermediate column result being a previously determined result for the column corresponding to a different pair or pairs of rows;

(c) multiplying the $A_{j1}$ operand segment by the first B operand segment ($B_{x1}$);

(d) if j>0, then multiplying a previously read $A_j$ operand segment stored in a cache ($A_{j0}$) by the second B operand segment ($B_{x2}$), where the weight ($j_0$) of the previously read $A_{j0}$ operand segment together with the weight ($x_2$) of the second B operand segment equals the weight y of the column;

(e) accumulating the results of the one or two multiplication operations and the intermediate column result $Int_y$ (if any) and a carry value $C_{y-1}$ (if any) for a previously calculated column having a weight y-1 to provide an accumulation result;

(f) if there are no further rows to calculate for the column, then writing the least significant n bits of the accumulation result to the memory as a final column result $R_y$, else writing the least significant n bits of the accumulation result to the memory as an intermediate column result $Int_y$; and (g) incrementing j by 1 and reiterating the steps (a) through (g) until incrementing j by 1 will exceed a value of k;

where the steps (a) through (d) do not have to be performed in the order shown.

11. The method of claim 10, wherein the multiplication operations are performed on pairs of rows selected according to a numerical sequence of increasing or decreasing weight values of the weights for the rows included in each pair.

12. The method of claim 10, wherein the multiplication operations are performed on pairs of rows selected randomly from the m+1 rows.

13. A computer program product, tangibly stored on a computer-readable medium, for operating a multiplication circuit to compute the product of two operands (hereby identified as A and B), at least one of which is wider than the multiplication circuit, where operand A comprises one or more contiguous ordered word-wide operand segments characterized by weight j and identified as $A_j$, where j is an integer from 0 to k and operand B comprises one or more contiguous ordered word-wide operand segments characterized by weight i and identified as Bj, where i is an integer from 0 to m, and a word is a specified number of bits (n), and where the multiplication circuit executes a matrix of word-wide operand segment pair multiplication operations, the matrix comprising m+1 rows and k+m+2 columns, each row having a weight x where x is an integer from 0 to m and each column having a weight y where y is an integer from 0 to (k+m+1), the multiplication circuit having access to a memory, comprising instructions operable to cause a programmable processor to:

performing multiplication operations on a pair of rows at one time, where for each pair of rows a pair of $B_i$ word-wide operand segments are read from the memory which $B_i$ segments have weights (i) that correspond to the weights (x) of the rows in the pair and word-wide operand segment pair multiplication operations ($A_j * B_i$) are iteratively performed for each of k+2 columns where for a cell that corresponds to a row with weight x and a column with weight y the word-wide operand segment pair multiplication operation comprises $A_j$ multiplied by $B_i$ where weight j is equal to (y−x) and where weight i is equal to x, such that for each column in the matrix a maximum of two additional memory read operations in addition to reading the pair of $B_i$ word-wide operand segments from memory and one memory write operation is required.

14. The computer program product of claim 13, wherein the multiplication operations are performed on pairs of rows selected according to a numerical sequence of increasing or decreasing weight values of the weights for the rows included in each pair.

15. The computer program product of claim 13, wherein the multiplication operations are performed on pairs of rows selected randomly from the m+1 rows.

16. The computer program product of claim 13, where a word-wide operand segment pair multiplication operation for a column having a weight $y_1$, comprises performing at least one multiplication operation of an $A_j$ word-wide operand segment by a $B_i$ word-wide operand segment, where the sum of the weight j of the $A_j$ word-wide operand and the weight i of the $B_i$ word-wide operand segment is equal to the weight $y_1$ of the column.

17. The computer program product of claim 13, further comprising instructions operable to cause a programmable processor to:

calculate an n-bit final column result for each of the k+m+2 columns, where a final column result for a column comprises a least significant n-bit word of an accumulation of the word-wide operand segment pair multiplication operations performed for the each of the m+1 rows in relation to said column.

18. The computer program product of claim 17, where instructions operable to calculate an n-bit final column result for a column comprise instructions operable to cause a programmable processor to accumulate, for a final pair of rows calculated for the column, results of the word-wide operand segment pair multiplication operations, an intermediate column result (if any) for the column, and a carry value (if any) being an upper word of an accumulation result determined for a previously calculated column, to determine an accumulation result for said column, where the n-bit final column result comprises the least significant n bits of the accumulation result for said column.

19. The computer program product of claim 18, further comprising instructions operable to cause a programmable processor to:

calculate an n-bit intermediate column result for a column, where an intermediate column result for a column comprises accumulating, for a pair of rows that are not the final pair of rows to be calculated for the column, results of the word-wide operand segment pair multiplication operations, a previously calculated intermediate column result (if any) for the column, and a carry value (if any) for a previously calculated column, to determine an intermediate accumulation result for said column, where the intermediate column result comprises the least significant n bits of the intermediate accumulation result for said column.

20. The computer program product of claim 19, where an upper word of the intermediate accumulation result for said column comprises a carry value for said column to be used in an accumulation operation for a next column.

21. The computer program product of claim 13, where the pair of $B_i$ word-wide operand segments read from memory corresponding to the pair of rows are stored in a cache while the multiplication operations for the pair of rows are performed.

22. A system for computing the product of two operands (hereby identified as A and B), at least one of which is wider than a width associated with the multiplication circuit, where operand A comprises one or more contiguous ordered word-wide operand segments characterized by weight j and identified as $A_j$, where j is an integer from 0 to k and operand B comprises one or more contiguous ordered word-wide operand segments characterized by weight i and identified as $B_i$, where i is an integer from 0 to m, and a word is a specified number of bits (n), and where the system executes a matrix of word-wide operand segment pair multiplication operations, the matrix comprising m+1 rows and k+m+2 columns, each row having a weight x where x is an integer from 0 to m and each column having a weight y where y is an integer from 0 to (k+m+1), the multiplication circuit having access to a memory, the system comprising:

a multiplier including one or more inputs configured to receive word-wide operand segments to be multiplied to form a two-word-wide intermediate product and configured to perform a multiplication operation of a pair of word-wide operand segments;

an accumulator including:

one or more inputs configured to receive the two-word-wide intermediate product from the multiplier, an intermediate column result from a cache and a carry value from the cache;

one or more outputs configured to provide the least significant n bits of an accumulation of the two-word-wide intermediate product, intermediate column result and carry value to the cache as an intermediate or final column result and further configured to provide the upper bits of the said accumulation to the cache as a carry value;

where said accumulator is configured to perform an accumulation operation of the inputs received therein;

a cache configured to receive and transmit word-wide operand segments from and to a memory and connected to the multiplier and the accumulator to supply inputs thereto and receive outputs therefrom; and an operations sequencer configured to control the cache's accessing of the memory and to control the sequence of multiply and accumulate operations performed by the multiplier and accumulator respectively;

wherein said sequences are defined to perform multiplication operations on a pair of rows at one time, where for each pair of rows a pair of $B_i$ word-wide operand segments are read from the memory into the cache which Bi segments have weights (i) that correspond to the weights (x) of the rows in the pair and word-wide operand segment pair multiplication operations ($A_j*B_i$) are iteratively performed by the multiplier for each of k+2 columns where for a cell that correspond to a row with weight x and a column with weight y the word-wide operand segment pair multiplication operation comprises $A_j$ multiplied by $B_i$ where weight j is equal to (y−x) and where weight i is equal to x, such that for each column in the matrix a maximum of two memory read operations in addition to reading the pair $B_j$ word-wide operand segments from memory and one memory write operation to and from the cache is required.

23. The system of claim 22, further comprising:
the memory, where the memory requires two memory interfaces.

24. The system of claim 22, further comprising:
the memory, where the memory is a single dual port RAM (random access memory).

25. The system of claim 22, further comprising:
the memory, where the memory comprises two single port RAMs.

26. A computer implemented method to compute the product of two operands (hereby identified as A and B), at least one of which is wider than a width associated with a multiplication circuit performing the multiplication, the method comprising:

creating a matrix of word-wide operand segment pair multiplication operations, the matrix comprising m+1 rows and k+m+2 columns, each row having a weight x where x is an integer from 0 to m and each column having a weight y where y is an integer from 0 to (k+m+1), where operand A comprises one or more contiguous ordered word-wide operand segments characterized by weight j and identified as $A_j$, where j is an integer from 0 to k and operand B comprises one or more contiguous ordered word-wide operand segments characterized by weight i and identified as $B_i$, where i is an integer from 0 to m, and a word is a specified number of bits (n); and performing multiplication operations on a pair of rows at one time, where for each pair of rows a pair of $B_i$ word-wide operand segments are read from the memory which $B_i$ segments have weights (i) that correspond to the weights (x) of the rows in the pair and word-wide operand segment pair multiplication operations ($A_j*B_i$) are iteratively performed for each of k+2 columns where for a cell that corresponds to a row with weight x and a column with weight y the word-wide operand segment pair multiplication operation comprises $A_j$ multiplied by $B_i$ where weight j is equal to (y−x) and where weight i is equal to x, such that for each column in the matrix a maximum of two memory read operations in addition to reading the pair of $B_i$ word-wide operand segments from memory and one memory write operation is required.

27. The method of claim 26, wherein the multiplication operations are performed on pairs of rows selected according to a numerical sequence of increasing or decreasing weight values of the weights for the rows included in each pair.

28. The method of claim 26, wherein the multiplication operations are performed on pairs of rows selected randomly from the m+1 rows.

29. A system for operating a multiplication circuit to compute the product of two operands (hereby identified a A and B), at least one of which is wider than the multiplication circuit, where operand A comprises one or more contiguous ordered word-wide operand segments characterized by weight j and identified as $A_j$, where j is an integer from 0 to k and operand B comprises one or more contiguous ordered word-wide operand segments characterized by weight i and identified as $B_i$, where i is an integer from 0 to m, and a word is a specified number of bits (n), and where the multiplication circuit executes a matrix of word-wide operand segment pair multiplication operations, the matrix comprising m+1 rows and k+m+2 columns, each row having a weight x where x is an integer from 0 to m and each column having a weight y where y is an integer from 0 to (k+m+1), the multiplication circuit having access to a memory, comprising:

a means to perform multiplication operations on a pair of rows at one time, where for each pair of rows a pair of $B_i$ word-wide operand segments are read from the memory which $B_i$ segments have weights (i) that correspond to the weights (x) of the rows in the pair and word-wide operand segment pair multiplication operations ($A_j*B_i$) are iteratively performed for each of k+2 columns where for a cell that corresponds to a row with weight x and a column with weight y the word-wide operand segment pair multiplication operation comprises $A_j$ multiplied by $B_i$ where weight j is equal to (y−x) and where weight i is equal to x, such that for each column in the matrix a maximum of two memory read operations in addition to reading the pair of $B_i$ word-wide operand segments from memory and one memory write operation is required.

* * * * *

UNITED STATES PATENT AND TRADEMARK OFFICE
CERTIFICATE OF CORRECTION

PATENT NO. : 8,028,015 B2
APPLICATION NO. : 11/837387
DATED : September 27, 2011
INVENTOR(S) : Vincent Dupaquis and Russell Hobson It is certified that error appears in the above-identified patent and that said Letters Patent is hereby corrected as shown below:

In column 13, line 16, in Claim 10, please delete "operad" and insert --operand--;

In column 13, line 18, in Claim 10, after "weight" please insert --i--;

In column 13, line 31, in Claim 10, please delete "($B_2$)" and insert --($B_{x2}$)--;

In column 13, line 34, in Claim 10, please delete "$A_j$" and insert --$A_{j1}$--;

In column 14, line 15, in Claim 13, please delete "$B_j$," and insert --$B_i$,--;

In column 14, line 32, in Claim 13, please delete "weighty" and insert --weight y--;

In column 14, line 36, in Claim 13, after "two", please delete "additional";

In column 16, line 15, in Claim 22, please delete "$B_i$ and insert --$B_i$--;

In column 16, line 26, in Claim 22, please delete "$B_j$" and insert --$B_i$--; and In column 17, line 11, in Claim 29, please delete "a" and insert --as--.

Signed and Sealed this
Tenth Day of April, 2012

David J. Kappos
*Director of the United States Patent and Trademark Office*